(12) United States Patent
Holm et al.

(10) Patent No.: US 7,352,652 B2
(45) Date of Patent: Apr. 1, 2008

(54) ULTRASONIC TRACKING AND LOCATING SYSTEM

(75) Inventors: Sverre Holm, Asker (NO); Rune Holm, Asker (NO); Svein Rostad, Rollag (NO)

(73) Assignee: Sonitor Technologies AS, Oslo (NO)

( * ) Notice: Subject to any disclaimer, the term of this patent is extended or adjusted under 35 U.S.C. 154(b) by 137 days.

(21) Appl. No.: 10/534,591

(22) PCT Filed: Dec. 2, 2003

(86) PCT No.: PCT/NO03/00404

§ 371 (c)(1),
(2), (4) Date: May 11, 2005

(87) PCT Pub. No.: WO2004/051304

PCT Pub. Date: Jun. 17, 2004

(65) Prior Publication Data

US 2006/0013070 A1    Jan. 19, 2006

(30) Foreign Application Priority Data

Dec. 4, 2002    (NO) ................................. 20025834

(51) Int. Cl.
*G01S 5/30*    (2006.01)
(52) U.S. Cl. ...................................... 367/128
(58) Field of Classification Search .................. 367/128
See application file for complete search history.

(56) References Cited

U.S. PATENT DOCUMENTS

| 5,051,741 A | 9/1991 | Wesby |
| 5,119,104 A | 6/1992 | Heller |
| 5,245,317 A | 9/1993 | Chidley |
| 5,418,758 A | 5/1995 | Webster |
| 5,528,232 A | 6/1996 | Verma et al. |

(Continued)

FOREIGN PATENT DOCUMENTS

GB    2265038    9/1993

(Continued)

OTHER PUBLICATIONS

P. Flikkema, "Spread-spectrum techniques for wireless communication," IEEE Signal Proc. Mag., May 1997.

(Continued)

*Primary Examiner*—Dan Pihulic
(74) *Attorney, Agent, or Firm*—O'Shea, Getz & Kosakowski. P.C

(57) ABSTRACT

The invention relates to a method and a system for monitoring and position determination of objects and/or living beings within an area, such as, e.g. a room in a building. The system comprises a plurality of electronic units, called identification tags, which are attached to the objects that have to be monitored. Each identification tag has its own identification code (ID code) and is equipped with an ultrasonic transmitter, radio transmitter and radio receiver. The ultrasonic signals are received by one or more master and slave units which calculate transit time differences of ultrasonic pulses. This information together with the identification tags' ID code, identification of the room in which it is located, and any additional information are transmitted to a central processing unit which calculates the identification tag's position and presents it to a user of the system.

34 Claims, 3 Drawing Sheets

U.S. PATENT DOCUMENTS

| | | | |
|---|---|---|---|
| 5,920,287 A | 7/1999 | Belcher | |
| 5,959,568 A * | 9/1999 | Woolley | 342/42 |
| RE36,791 E | 7/2000 | Heller | |
| 6,121,926 A | 9/2000 | Belcher | |
| 6,141,293 A | 10/2000 | Amorai-Moriya | |
| 6,317,386 B1 | 11/2001 | Ward | |
| 6,433,689 B1 | 8/2002 | Hovind | |
| 6,678,209 B1 | 1/2004 | Peng et al. | |
| 6,710,719 B1 | 3/2004 | Jones et al. | |
| 6,724,688 B2 | 4/2004 | Betts et al. | |
| 2006/0013070 A1* | 1/2006 | Holm et al. | 367/128 |
| 2006/0066444 A1* | 3/2006 | Steeves | 340/10.5 |

FOREIGN PATENT DOCUMENTS

| | | |
|---|---|---|
| GB | 2298098 | 8/1996 |
| WO | WO 99/28761 | 6/1999 |
| WO | WO 02/04975 | 1/2002 |
| WO | WO 03/087871 | 10/2003 |

OTHER PUBLICATIONS

Freitag et al. "Analysis of channel effects on direct-sequence and frequency-hopped spread-spectrum acoustic communication," IEEE Journ. Ocean. Eng., Oct. 2001.

N. M. Vallidis "WHISPER: A Spread Spectrum Approach to Occlusion in Acoustic Tracking", University of North Carolina at Chapel Hill, Department of Computer Science, 2002.

R. Palmer, "A spread spectrum acoustic ranging system--An overview," Proc. 2002 IEEE Canadian Conference on Electrical & Computer Engineering, May 2002.

* cited by examiner

ULTRASONIC TRACKING AND LOCATING SYSTEM

INTRODUCTION/TECHNICAL FIELD

The invention relates to a method and a system for monitoring and position determination of objects and/or living beings within an area such as, e.g. a room in a building or a road tunnel. The system comprises a plurality of electronic units called identification tags, which are attached to the objects that have to be monitored. Each identification tag has its own identification code (ID code) and is equipped with an ultrasonic transmitter, radio transmitter and radio receiver. The ultrasonic signals it transmits are transmitted while it simultaneously transmits radio signals. The ultrasonic signals are received by one or more master and slave units which calculate transit time differences of ultrasonic pulses. This information together with the identification tag's ID code, an identification of the room or area in which it is located, and any additional information are transmitted to a central processing unit which calculates the identification tag's position and presents it to a user of the system.

BACKGROUND TO THE INVENTION

There are a number of different positioning systems in existence today based on various principles including ultrasound and radio waves. These systems all have both advantages and disadvantages. The system according to the invention employs identification tags which are placed on the objects to be monitored. The identification tags contain an ultrasonic transmitter, radio transmitter and radio receiver.

Systems based on radio waves, for example in one of the unlicensed ISM bands (Industrial, Scientific, Medical), for example 2.4 GHz for WLAN or Bluetooth™ plug-in wireless network card in PCs have the following advantages: they have a high data transfer rate, they can tolerate a lot of movement (Doppler shift) and have a long range. The disadvantages of such a system are that the long range makes it necessary to use 3 or more base stations in order to obtain a position.

Location systems based on ultrasound have the following advantages: they have a short range, the waves do not pass through walls, i.e. they are easy to position at room level and the detectors are cheap. The disadvantages are that these systems have a low transfer capacity and cannot tolerate much movement.

The invention outlined herein combines the best features of radio and ultrasound-based systems. The system may advantageously be employed in areas which are traditionally used for only radio-based systems or only ultrasound-based systems.

By using ultrasound for calculating transit time differences of ultrasonic pulses at different locations in a room or area at the same time as radio waves for transferring the ID code and other information, the system attains a high data transfer capacity and becomes insensitive to Doppler shift.

Prior Art

Several different principles exist today for locating objects within a limited area. The systems are generally based on ultrasonic and/or radio communication.

U.S. Pat. No. 6,433,689, which is the applicant's own patent, is an example of a system based on ultrasound. In this patent a system is described for control and surveillance of objects or people. This is implemented by attaching identification tags to the object that is required to be monitored. The tags, which have a unique identification code, are provided with a transmitter and receiver for communicating by ultrasound as well as sound in the audible range. The present invention differs from this in that it employs both ultrasound and radio waves.

U.S. Pat. No. 6,141,293 describes a system where ultrasound is combined with radio waves. The difference from the present invention is that the fixed units (the detectors) initiate a positioning by transmitting a radio signal which is received by identification tags transmitting ultrasound.

This also applies to U.S. Pat. No. 6,317,386 which describes a system combining ultrasonic and radio waves. The system works in such a manner that the identification tags are called up by means of radio waves, while the actual communication between transmitter units and base stations is conducted by means of ultrasound. The object of this system, which is for indoor use, is to increase the capacity of an ultrasound-based system. This is accomplished by periodically calling up each tag, which has a unique address, by means of radio waves. The identification of each tag therefore does not need to be transmitted to the base station by means of ultrasound. The area of application of this system is restricted, the system requires accurate location of all the receivers in advance and complicated signal processing, and it functions best when there is an unobstructed view between the transmitter and the receivers. The present invention is also a system which combines ultrasonic and radio waves. However, unlike U.S. Pat. No. 6,141,293 and U.S. Pat. No. 6,317,386 it is the tag itself which initiates transmission of ultrasound, and all information concerning transit time differences of ultrasonic pulses and identification of the tag transmitting the ultrasonic pulses is transmitted from a master unit to a central processing unit. By using such a system a wider area of application is achieved than with the system described in U.S. Pat. No. 6,141,293 and U.S. Pat. No. 6,317,386. The system, moreover, will not be sensitive to movement of the identification tag when it is transmitting signals, and the system does not need extensive calibration.

U.S. Pat. No. 6,121,926 also describes a system for location of identification tags. In this case the tags are attached to objects in a logistics system. When an identification tag transmits a signal with its identification, it has to be received on 3 or more base stations, where an analysis is made of transit time differences and the position is determined. In practice, the accuracy of such a system will be a few meters, thus making it difficult to determine which room an object is located in without extensive calibration. Moreover, the cost per base station with antenna for the radio is substantially greater than the cost of the ultrasonic transmitters, even though one ultrasonic transducer often has to be placed in each room. U.S. Pat. No. 6,121,926 essentially describes an improved signal processing method for improving the location of identification tags by distinguishing between direct waves and reflected waves. This requires processing power which is also not required in the present invention.

BRIEF DESCRIPTION OF THE INVENTION

The present invention relates to a method and a system for monitoring and position determination of identification tags which can be attached to objects. The object of the invention is to provide a flexible system that combines the use of ultrasonic waves and radio waves.

The system comprises a plurality of electronic units, called identification tags, which are attached to the objects to be monitored. Each identification tag has its own identification code and is equipped with an ultrasonic transmitter, radio transmitter and radio receiver. The ultrasonic transmitter is initiated by the identification tag itself. The ultrasonic signals it transmits are transmitted almost simultaneously with its transmission of radio signals. The ultrasonic signals are received by one or more master and slave units which calculate transit time differences for the ultrasonic pulses. This information together with the identification tag's ID code, an identification of the room in which it is located, and any additional information are transmitted to a central processing unit which calculates the identification tag's position and presents it to a user of the system.

The system and the method according to the invention permit a high data transfer capacity to be achieved, and position can be measured even though the identification tag in question is moving to a substantial extent.

As already mentioned, each identification tag according to the invention is equipped with a radio transmitter, radio receiver and ultrasonic transmitter. Furthermore, each room or area in which the system is to be used is equipped with one or more stationary units which receive ultrasonic pulses and radio signals. The stationary units in the system consist of master units and slave units. A master unit comprises an ultrasonic receiver, means for calculating transit time differences of ultrasonic pulses, means for transmitting and receiving radio signals and a network connection for transmitting information to a central unit. A slave unit comprises an ultrasonic receiver and means for calculating and transmitting transit time differences of ultrasonic pulses to master units.

The connection between master units and slave units is either wireless or wire-based. For a wireless connection the use of radio waves is preferred. The connection between master units and server may also be wireless or wire-based, where the use of radio waves is preferred.

In the simplest embodiment there may be only one stationary master unit in each room or area, where each master unit receives control signals from an identification tag. The master unit will then transmit information concerning which room it is in to a central unit. In such a system, therefore, it is only possible to perform a rough positioning, i.e. to establish in which room the identification tag that is calling up the master unit is located.

In a preferred embodiment according to the description there is one stationary master unit in each room or area that is connected with a central processing unit, e.g. a server, and at least three slave units connected with the master unit. When an identification tag initiates transmission of ultrasonic pulses, this may be because it is set in motion, exposed to light, or at preset intervals. The identification tag will at all times be listening for radio signals transmitted from other identification tags. It will thereby know when others are not transmitting ultrasonic signals, and possibly which frequency or coding other identification tags are using if the system has been set up to use several different frequencies or codings. With a set-up of this kind, several identification tags in the same room can transmit ultrasonic signals simultaneously. Before the identification tag transmits ultrasonic signals, it transmits a radio message to other identification tags with a request whether it can transmit at the time concerned and possibly which frequency or coding it will employ. If it does not receive an engaged signal from other identification tags, it will start its transmission of ultrasonic pulses together with radio information with identification code and any additional information, such as, e.g. that an attempt has been made to open it.

The ultrasonic pulses transmitted from an identification tag will be detected by master and slave units. At the same time the radio signals with identification code and any additional information are received on the master units. The slave units will transmit their information on transit time differences to a master unit in the room or area in which they are located. The master unit will then transmit all the information it has received including information on which room it is in to a central unit which calculates the position of the identification tag which transmitted the ultrasonic pulses.

The object of the invention is achieved with a system and a method as described in the set of claims, and which will be described in greater detail below.

LIST OF DRAWINGS

The invention will be further described with reference to the drawings, in which.

DETAILED DESCRIPTION

The system according to the invention is constructed in such a manner as to obtain high data transfer capacity and insensitivity to Doppler shift. There are several technical features with regard to transmitter, receiver and central unit that contribute to this. As a whole it represents a system that is well suited to different environments. The advantages of the invention are achieved by combining the use of radio waves with ultrasonic waves in a manner described in greater detail below.

Figure 1:
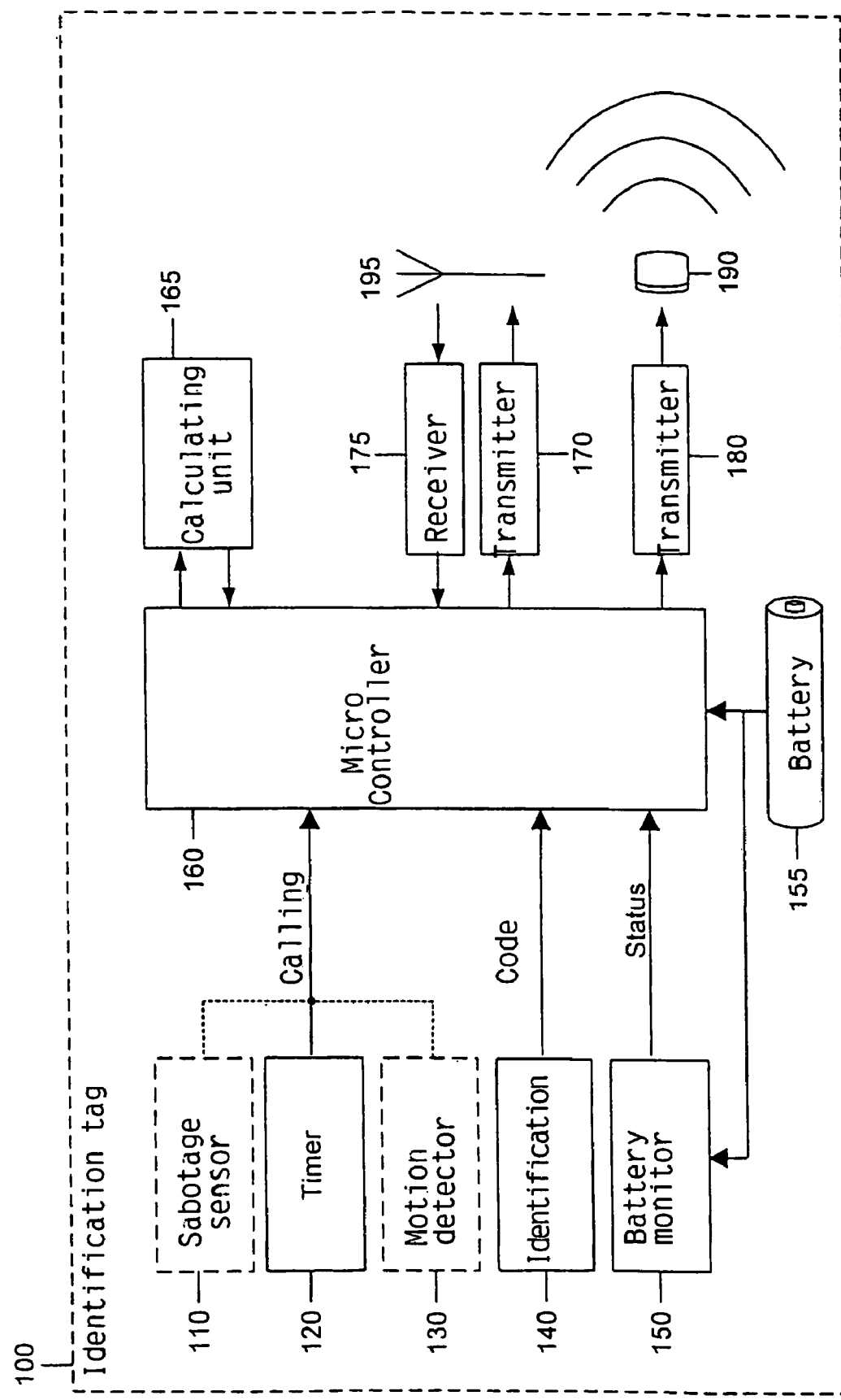
FIG. 1 illustrates the construction of an identification tag for this system.

FIG. 1 illustrates which units may typically be incorporated in each identification tag 100. The identification tag 100 for use in a system 400 (FIG. 3) for determining the position of the identification tag 100 in a building or other areas that require to be monitored, comprises an ultrasonic transducer 190 connected to a transmitter 180 adapted to transmit ultrasonic signals, together with a radio transmitter 170 and radio receiver 175 connected to an antenna 195 for transmitting and receiving radio signals containing the identity of the identification tag 100. The identification tag further comprises a control unit 160 adapted to simultaneously control the transmission of ultrasonic signals and radio signals. The radio receiver 175 is connected to the control unit 160 and arranged to receive radio messages from other identification tags 100 and master units 200. The radio transmitter 170 is further connected to the control unit 160 and adapted to transmit radio messages to master units 200. An identification tag 100 may further comprise a sabotage unit 110 connected to the control unit 160, in order to detect any attempt to remove and/or open the identification tag 100, and where, after such detection, the control unit 160 is adapted to add such additional information to the radio signal transmitted from the identification tag 100.

Figure 2:
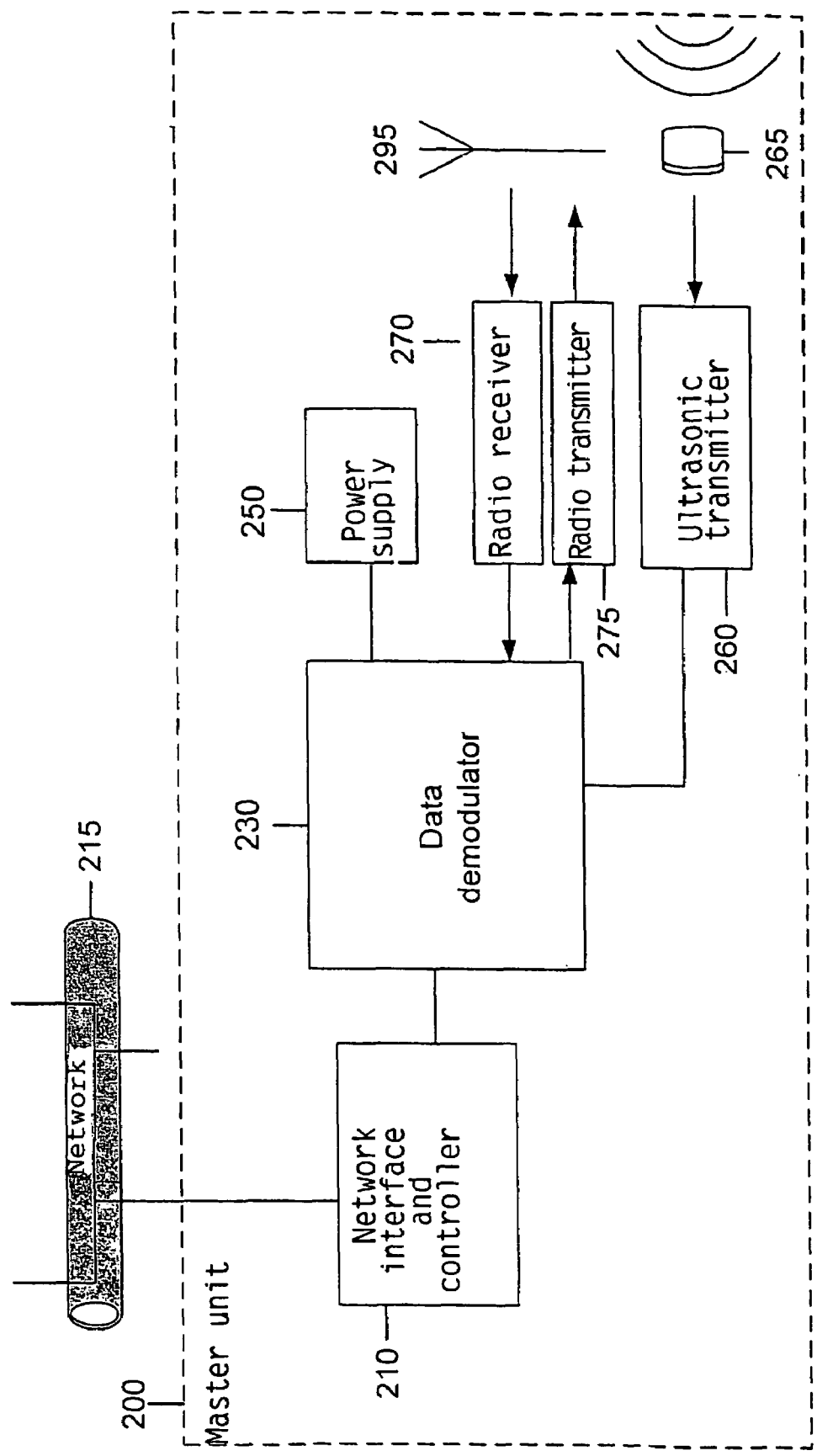
FIG. 2 illustrates the construction of a master unit.

FIG. 2 illustrates a stationary master unit 200, specially adapted to a system 400 for position determination of objects which may be in motion, comprising:

an ultrasonic transducer 265 for receiving ultrasonic signals in the form of ultrasonic pulses, together with a radio transmitter unit 275 and a radio receiver unit 270 connected to an antenna 295 for transmitting and receiving information from an identification tag 100 as described above, a receiver unit 260 for detecting ultrasonic pulses transmitted from the identification tag 100, signal processing means 230 for receiving and interpreting radio signals, and for executing the following steps for processing the received ultrasonic pulses:

calculating transit time differences for received ultrasonic pulses transmitted from the identification tag 100, transmitting to a central processing unit 410 via a network 215 data containing transit time differences for received ultrasonic pulses, an identification of the room in which it is located, and the identification of the identification tag 100.

Figure 3:
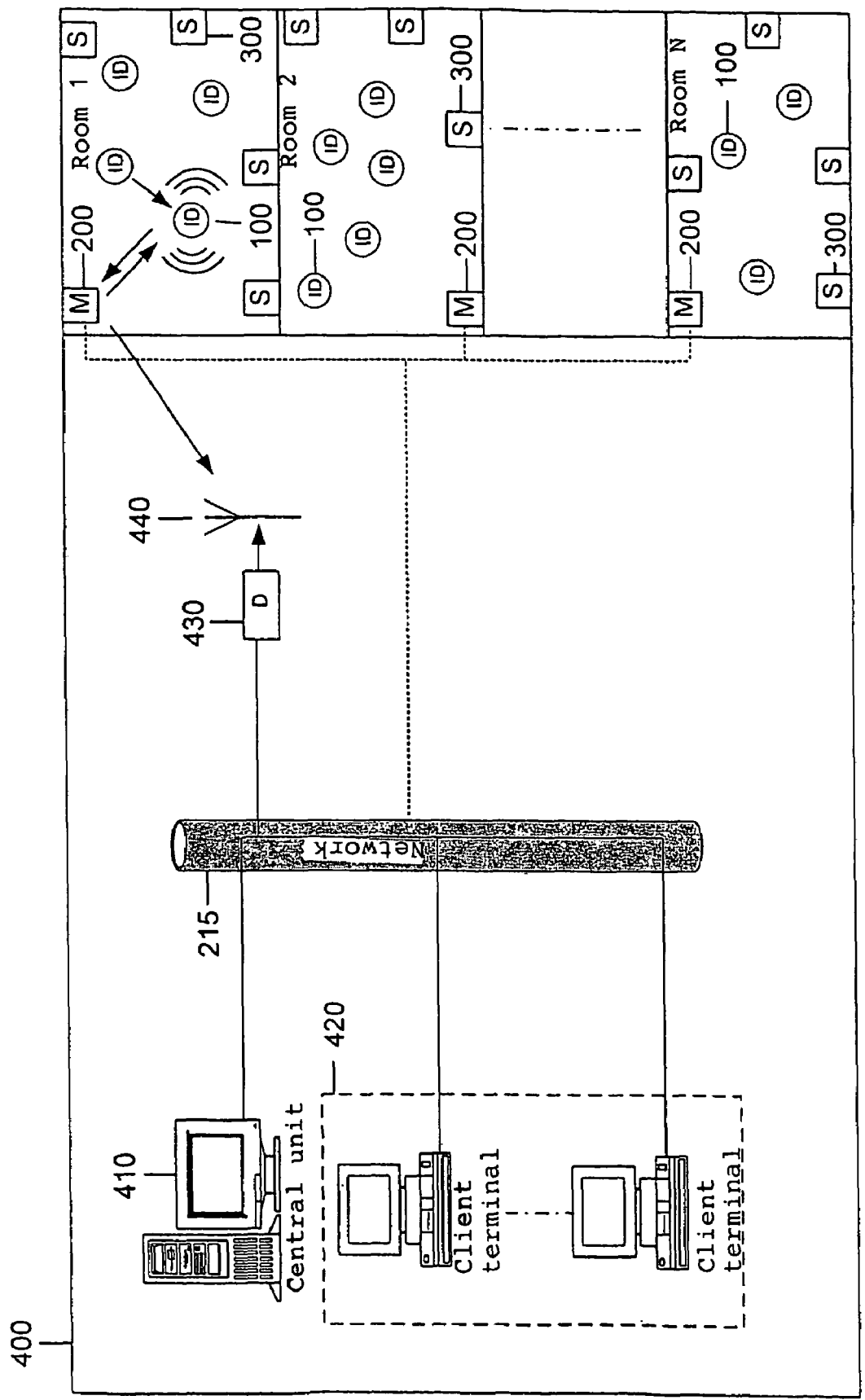
FIG. 3 illustrates how the whole system is combined in a network.

FIG. 3 shows an overview of the whole system 400 according to the invention. The figure illustrates the interplay between the various units for position determination of at least one identification tag 100 and comprises:

at least one identification tag 100 as described above and one or more master units 200 for detecting transit time differences for the ultrasonic pulses transmitted from the identification tag 100, one or more slave units 300 with means for receiving ultrasonic signals in the form of ultrasonic pulses, means for detecting ultrasonic pulses transmitted from the identification tag 100, means for measuring transit time differences for received ultrasonic pulses, together with means for transmitting this information to master units, a network 215 interconnecting several slave units 300 and master units 200, at least one central processing unit 410 for collecting, interpreting and processing data transmitted from master units 200, a network 215 interconnecting several master units 200 with the central processing unit 410, and processing means in the central processing unit 410 for determining the position of a transmitter unit 100.

The network connection 215 connecting stationary slave units 300 and master units 200 may be based on radio waves or be wire based.

The connection between master units 200 and the central processing unit 410 may be based on radio waves or be wire-based.

The method for using the system according to the invention will now be described. In order to determine the position of one or more objects which may be in motion in a room in a building or other areas, the method comprises:

a) employing an identification tag 100 as described above to listen for radio messages, b) transmitting a radio message from the identification tag 100 with a request for permission to transmit ultrasonic pulses, c) receiving a radio message from other identification tags 100 if they are simultaneously executing transmission of ultrasonic signals, d) transmitting an ultrasonic pulse from the identification tag 100 while it simultaneously transmits a radio signal if it has not received a radio message telling that other identification tags 100 are transmitting, e) receiving the ultrasonic pulse from the identification tag 100 on one or more master units 200 and slave units 300, while master units 200 are also simultaneously receiving a radio signal from the identification tag 100, f) receiving the radio signal from the identification tag 100 on a master unit 200, g) calculating transit time differences for received ultrasonic pulse on master units 200 and slave units 300, h) transmitting information on transit time differences from slave units 300 to master units 200, i) transmitting information on transit time differences and radio signal information received in master units 200 from slave units 300 and identification tag 100 to a central processing unit 410, j) calculating the position of the identification tag 100 which transmitted the ultrasonic pulse on the basis of the identification of the identification tag 100 and transit time differences of transmitted ultrasonic pulse from the identification tag 100, together with knowledge of the position of each individual master unit 200 and slave unit 300 in each room or area.

The radio message to which the identification tag 100 listens may include information concerning which ultrasonic frequency or coding is employed by other identification tags 100 which are currently transmitting ultrasonic pulses.

The request in the form of a radio message from the identification tag 100 is transmitted when the identification tag 100 is set in motion, after a preset time, or when parts of the identification tag 100 are exposed to light. The latter may occur, e.g. when an attempt is made to open or remove it from the object to which it is attached.

When the system is set up for the use of several different frequencies or codings in the same room or area, the frequency or coding of the ultrasonic pulse transmitted by the identification tag 100 is different from that currently employed by other identification tags 100.

The radio signal transmitted from the identification tag 100, which is transmitted simultaneously with the transmission of an ultrasonic pulse, contains the identification number, the ultrasonic frequency or coding employed by the identification tag 100, and may further contain additional information, such as that an attempt has been made to remove the tag.

In the simplest embodiment with only one stationary master unit in each room, steps g) to i) above are not necessary, and calculation of transit time differences in step j) will be dropped.

The system and method described herein have a variety of areas of application. As already mentioned, a preferred application is to use the system for tracking and determining the position of objects, e.g. in a hospital which may contain many rooms.

The invention claimed is:

1. An identification tag for use in a system for determining the position of the identification tag, which may be in motion in a room in a building or other areas to be monitored, comprising an ultrasonic transducer connected to a transmitter adapted to transmit ultrasonic signals, together with a radio transmitter and radio receiver connected to an antenna for transmitting radio signals containing the identity of the identification tag, the ultrasonic transducer and radio transmitter being arranged to transmit at preset intervals or in response to the tag being set in motion or exposed to light.

2. An identification tag according to claim 1, comprising a control unit adapted to control the transmission of ultrasonic signals and radio signals.

3. An identification tag according to claim 2, wherein the radio receiver is connected to the control unit and arranged to receive radio messages from other identification tags.

4. An identification tag according to claim 2, wherein the radio receiver is connected to the control unit and arranged to receive radio messages from stationary master units.

5. An identification tag according to claim 2, wherein the radio transmitter is connected to the control unit and adapted to transmit radio messages to stationary master units.

6. An identification tag according claim 2, further comprising a sabotage unit connected to the control unit for detecting any attempt to remove and/or open the identification tag, and wherein after such detection, the control unit is adapted to add such additional information to the radio signal transmitted from the identification tag.

7. A stationary master unit, specially adapted to a system for position determination of objects which may be in motion, comprising:
   an ultrasonic transducer for receiving ultrasonic signals in the form of ultrasonic pulses, together with a radio transmitter unit and a radio receiver unit connected to an antenna for transmitting and receiving information from an identification tag according to claim 1,
   a receiver unit for detecting ultrasonic pulses transmitted from the identification tag,
   signal processing means for receiving and interpreting radio signals, and for executing the following steps for processing the received ultrasonic pulses:
   calculating transit time differences for received ultrasonic pulses transmitted from the identification tag,
   transmitting to a central processing unit via a network data containing transit time differences for received ultrasonic pulses, an identification of the room in which it is located, and the identification of the identification tag.

8. A system for determining the position of at least one identification tag, comprising:
   at least one identification tag according to claim 1,
   one or more stationary master units according to claim 7 for detecting transit time differences for the ultrasonic pulses transmitted from the identification tag,
   one or more stationary slave units with means for receiving ultrasonic signals in the form of ultrasonic pulses, means for detecting ultrasonic pulses transmitted from the identification tag, means for measuring transit time differences for received ultrasonic pulses, together with means for transmitting this information to stationary master units,
   a network interconnecting several stationary slave units and stationary master units,
   at least one central processing unit for collecting, interpreting and processing data transmitted from master units,
   a network interconnecting several stationary master units with the central processing unit, and
   processing means in the central processing unit for determining the position of a transmitter unit.

9. A system according to claim 8, wherein the network connection interconnecting stationary slave units and stationary master units is radio-based.

10. A system according to claim 8, wherein the network connection interconnecting stationary slave units and stationary master units is wire-based.

11. A system according to claim 8, wherein the connection between stationary master units and the central processing unit is based on radio waves.

12. A system according to claim 8, wherein the connection between stationary master units and the central processing unit is wire-based.

13. A method for determining the position of one or more objects which may be in motion in a room in a building or other areas, comprising:

a) employing an identification tag according to claim 1 to listen for radio messages,
b) transmitting a radio message from the identification tag with a request for permission to transmit ultrasonic pulses,
c) receiving a radio message from other identification tags if they are simultaneously executing transmission of ultrasonic signals,
d) transmitting an ultrasonic pulse from the identification tag while it simultaneously transmits a radio signal, if it has not received a radio message telling that other identification tags are transmitting,
e) receiving the ultrasonic pulse from the identification tag on one or more stationary master units and stationary slave units, while stationary master units are also simultaneously receiving a radio signal from the identification tag,
f) receiving the radio signal from the identification tag on a stationary master unit,
g) calculating transit time differences for received ultrasonic pulse on stationary master units and slave units,
h) transmitting information on transit time differences from stationary slave units to stationary master units,
i) transmitting information on transit time differences, identification of room and radio signal information received in stationary master units from stationary slave units and identification tag to a central processing unit,
j) calculating the position of the identification tag which transmitted the ultrasonic pulse on the basis of the identification of the identification tag and transit time differences of transmitted ultrasonic pulse from the identification tag, together with knowledge of the position of each individual stationary master unit and stationary slave unit in each room or area.

14. A method according to claim 13, wherein the radio message to which the identification tag listens contains information concerning which ultrasonic frequency or coding is employed by other identification tags which are currently transmitting ultrasonic pulses.

15. A method according to claim 13, wherein the request in the form of a radio message from the identification tag is transmitted when the identification tag is set in motion.

16. A method according to claim 13, wherein the request in the form of a radio message from the identification tag is transmitted after a preset period.

17. A method according to claim 13, wherein the request in the form of a radio message from the identification tag is transmitted when parts of the identification tag are exposed to light.

18. A method according to claim 13, wherein the frequency or coding of the ultrasonic pulse employed by the identification tag is different to that currently employed by other identification tags.

19. A method according to claim 13, wherein the radio signal transmitted from the identification tag while it simultaneously transmits an ultrasonic pulse contains the identification number and ultrasonic frequency or coding employed by the identification tag.

20. A method according to claim 19, wherein the radio signal transmitted from the identification tag may further contain additional information, such as that an attempt has been made to remove the tag.

21. A method of determining the position of a tag comprising the step of:

transmitting ultrasonic and radio signals simultaneously from the tag at preset intervals or in response to the tag being set in motion or exposed to light.

22. A method as claimed in claim 21, further comprising the step of:

transmitting a radio message from the tag to another tag prior to performing the step of transmitting ultrasonic and radio signals simultaneously from the first tag.

23. A method as claimed in claim 22, wherein the step of transmitting ultrasonic and radio signals simultaneously is not performed if the tag first receives an engaged signal from a second tag.

24. A method as claimed in claim 22, further comprising conveying in said radio message information about said ultrasonic and radio signals selected from the group comprising the timing, the ultrasonic frequency and the coding of said signals.

25. A method as claimed in claim 21, further comprising conveying in said radio signals information selected from the group comprising the identity of the tag and the status of the tag.

26. A method as claimed in claim 25, wherein said ultrasonic signals do not convey information about the identity of the tag.

27. A method as claim in claim 21, further comprising the steps of:

sensing that the tag is being tampered with; and transmitting ultrasonic and radio signals simultaneously from the tag in response to said sensing.

28. An identification tag for use in a system for determining the position of the tag, wherein the tag is arranged to transmit ultrasonic and radio signals simultaneously at preset intervals or in response to being set in motion or exposed to light.

29. An identification tag as claimed in claim 28, wherein the tag is further arranged to transmit a radio message to another identification tag before a proposed simultaneous transmission of ultrasonic and radio signals.

30. An identification tag as claimed in claim 29, wherein the tag is further arranged to transmit ultrasonic and radio signals simultaneously only if it does not first receive an engaged signal from a second tag in response to a radio message from the first tag.

31. An identification tag as claimed in claim 29, wherein said radio message conveys information about the proposed simultaneous transmission of ultrasonic and radio signals selected from the group comprising the timing, the ultrasonic frequency and the coding of the signals.

32. An identification tag as claimed in claim 28, wherein said radio signals convey information selected from the group comprising the identity of the tag and the status of the tag.

33. An identification tag as claimed in claim 32, wherein said ultrasonic signals do not convey information about the identity of the tag.

34. An identification tag as claimed in claim 28 comprising a tamper sensor and being further arranged to transmit ultrasonic and radio signals simultaneously in response to activation of said tamper sensor.

* * * * *